US012542276B2

United States Patent
Borel et al.

(10) Patent No.: US 12,542,276 B2
(45) Date of Patent: Feb. 3, 2026

(54) METHOD FOR LASER TREATMENT OF A LITHIUM SURFACE

(71) Applicant: SAFT, Levallois-Perret (FR)

(72) Inventors: Philippe Borel, Blanquefort (FR); Maeva Gazziero, Bruges (FR); Delphin Levasseur, Bordeaux (FR); Julien Breger, Bordeaux (FR); Ekaterina Pavlenko, Puteaux (FR); Olivier Huchet, Latresne (FR); Sylvie Herreyre, Saint-Andre-de-Cubzac (FR)

(73) Assignee: SAFT, Levallois-perret (FR)

( * ) Notice: Subject to any disclaimer, the term of this patent is extended or adjusted under 35 U.S.C. 154(b) by 590 days.

(21) Appl. No.: 17/924,440

(22) PCT Filed: Apr. 29, 2021

(86) PCT No.: PCT/EP2021/061314
§ 371 (c)(1),
(2) Date: Nov. 10, 2022

(87) PCT Pub. No.: WO2021/228572
PCT Pub. Date: Nov. 18, 2021

(65) Prior Publication Data
US 2023/0343940 A1 Oct. 26, 2023

(30) Foreign Application Priority Data
May 11, 2020 (FR) ........................................ 2004625

(51) Int. Cl.
*H01M 4/00* (2006.01)
*B23K 26/38* (2014.01)
(Continued)

(52) U.S. Cl.
CPC ............. *H01M 4/382* (2013.01); *B23K 26/38* (2013.01); *H01M 4/06* (2013.01); *H01M 4/12* (2013.01);
(Continued)

(58) Field of Classification Search
CPC .......... H01M 4/12; H01M 4/06; H01M 4/405; H01M 4/1395; H01M 10/052; H01M 10/0565; H01M 6/04; Y02E 60/10
See application file for complete search history.

(56) References Cited

U.S. PATENT DOCUMENTS

2010/0038825 A1* 2/2010 McDonald ............. B23K 26/55
264/400
2019/0044186 A1* 2/2019 Kim .................... H01M 50/403

FOREIGN PATENT DOCUMENTS

EP 2162944 B1 8/2011
EP 3439072 A1 2/2019
(Continued)

OTHER PUBLICATIONS

Kwak et al., Three-Dimensional Thin Film Battery, Mar. 2016, See the Abstract. (Year: 2016).*
(Continued)

*Primary Examiner* — Tiffany Legette
*Assistant Examiner* — Monique M Wills
(74) *Attorney, Agent, or Firm* — Sughrue Mion, PLLC

(57) ABSTRACT

A method for treating a surface of a strip or film, the strip or film being made of lithium or a lithium-based alloy, the method comprising a step of radiating at least one portion of the surface of the strip or film with a laser beam, the radiating step being carried out in a controlled atmosphere, the laser beam radiating the entire area of the at least one portion of the surface of the strip or film.

12 Claims, 5 Drawing Sheets

(51) Int. Cl.
   H01M 4/06     (2006.01)
   H01M 4/12     (2006.01)
   H01M 4/134    (2010.01)
   H01M 4/1395   (2010.01)
   H01M 4/38     (2006.01)
(52) U.S. Cl.
   CPC ......... H01M 4/134 (2013.01); H01M 4/1395 (2013.01)

(56) References Cited

FOREIGN PATENT DOCUMENTS

| KR | 10-2008-0101725 A | 11/2008 | | |
|---|---|---|---|---|
| KR | 10-2017-0014216 A | 2/2017 | | |
| KR | 10-2018-0023547 A | 3/2018 | | |
| KR | 2018023547 A | * | 3/2018 | .......... H01M 4/0404 |
| WO | WO-2016033379 A1 | * | 3/2016 | ........ H01M 10/0436 |

OTHER PUBLICATIONS

Choi et al, Manufacturing method for lithium electrode, involves forming lithium metal layer containing lithium metal on current collector and forming pattern by irradiating laser over entire surface of lithium metal layer, Mar. 2018, See the Abstract. (Year: 2018).*
International Search Report of PCT/EP2021/061314 dated May 20, 2021 [PCT/ISA/210].

* cited by examiner

[Fig. 1]
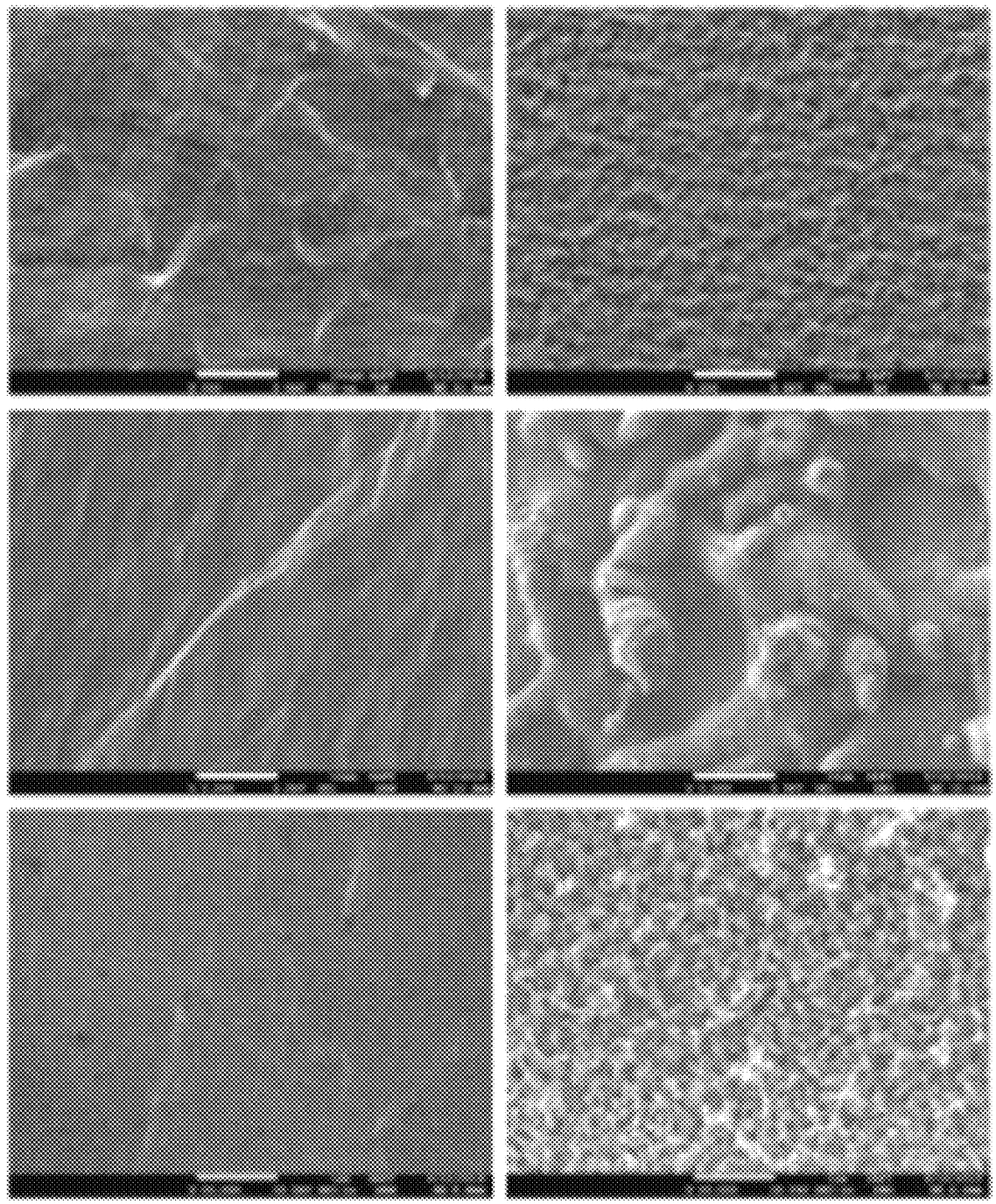

[Fig. 2]
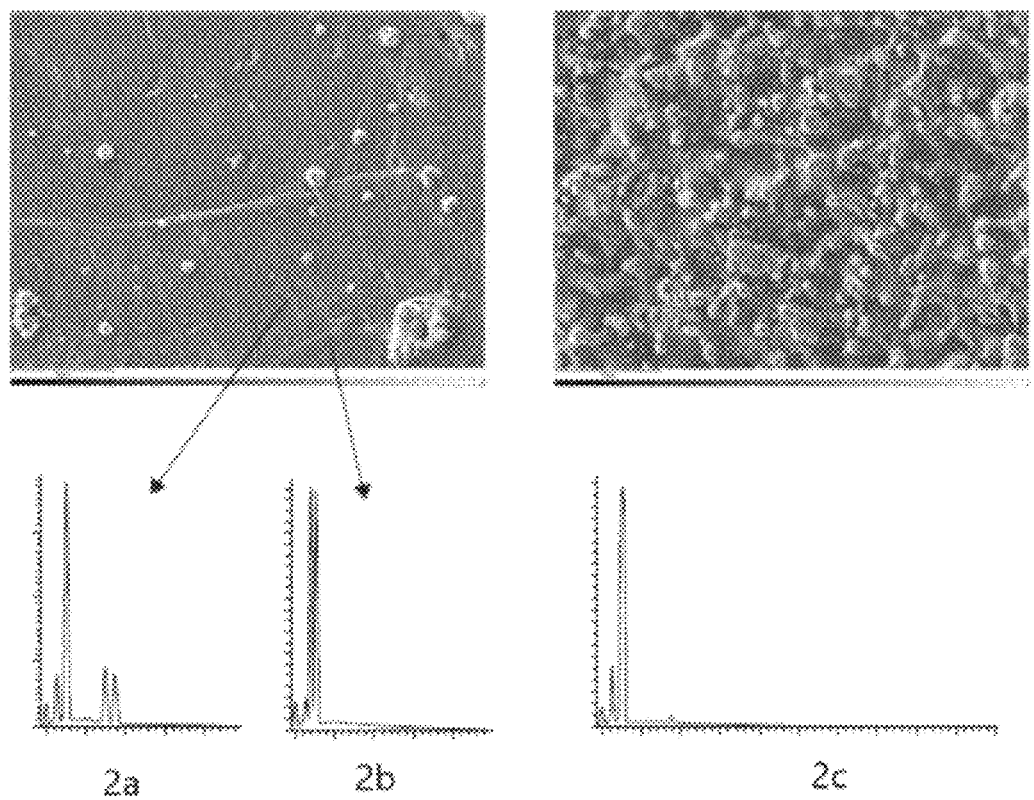
2a　　　2b　　　2c
[Fig. 3]
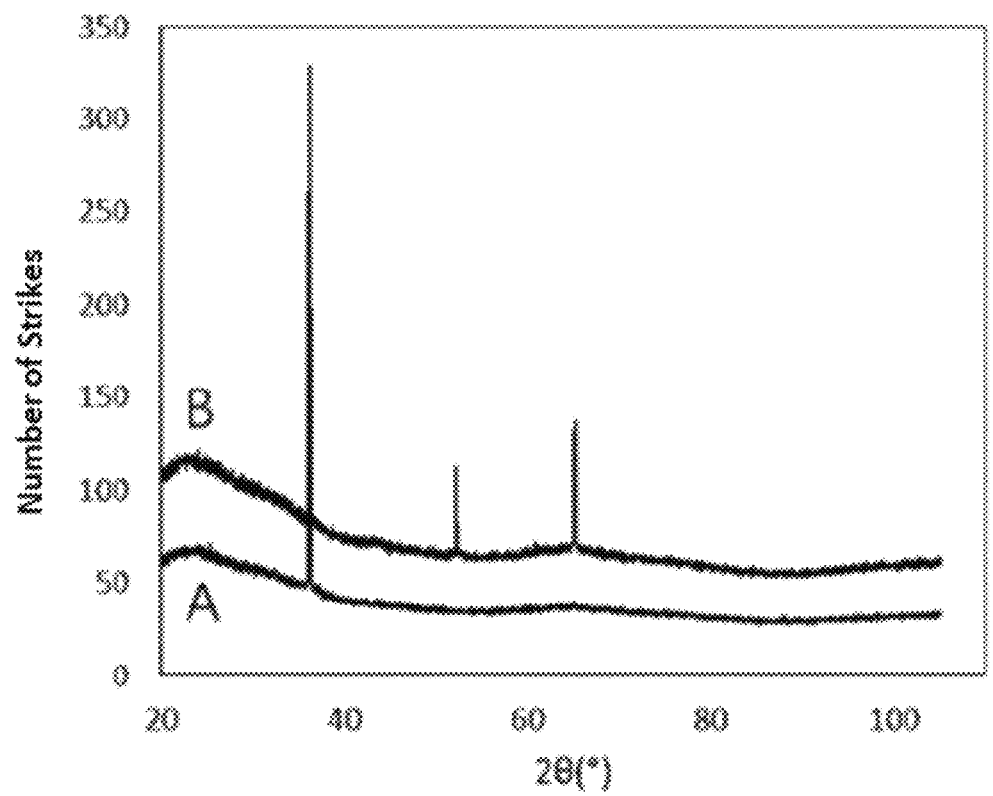

[Fig. 4]
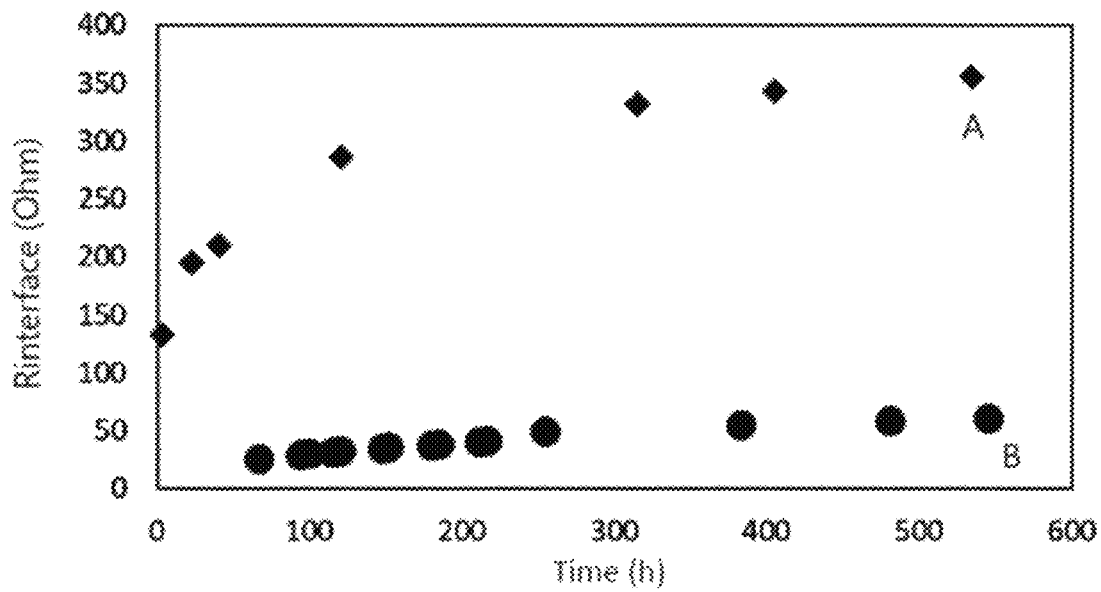
[Fig. 5]
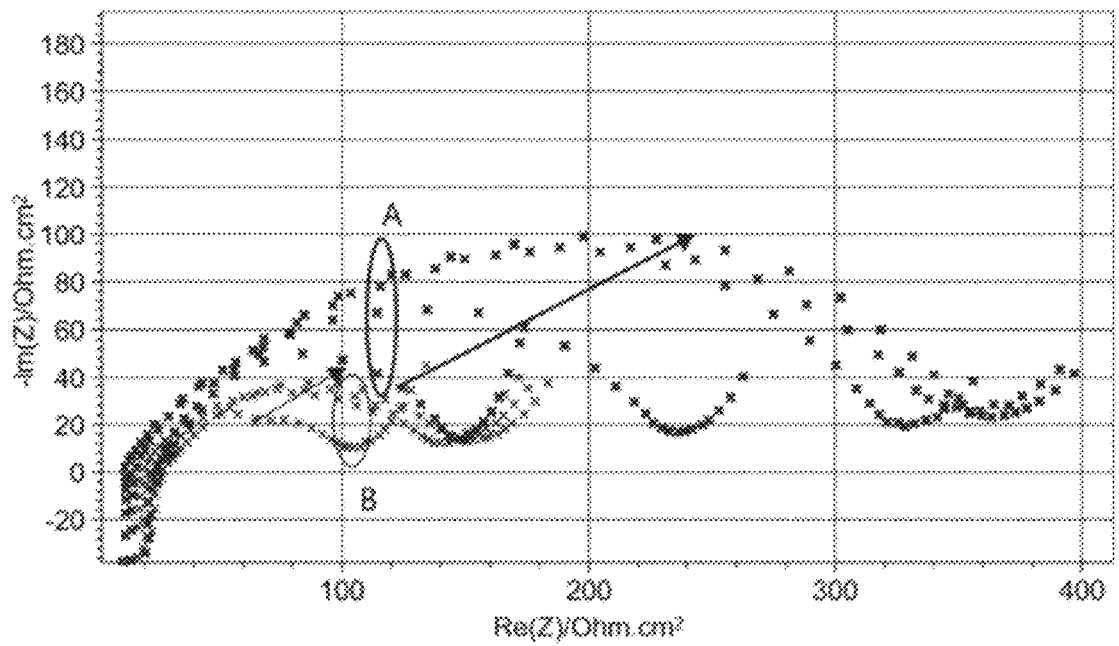

[Fig. 6]
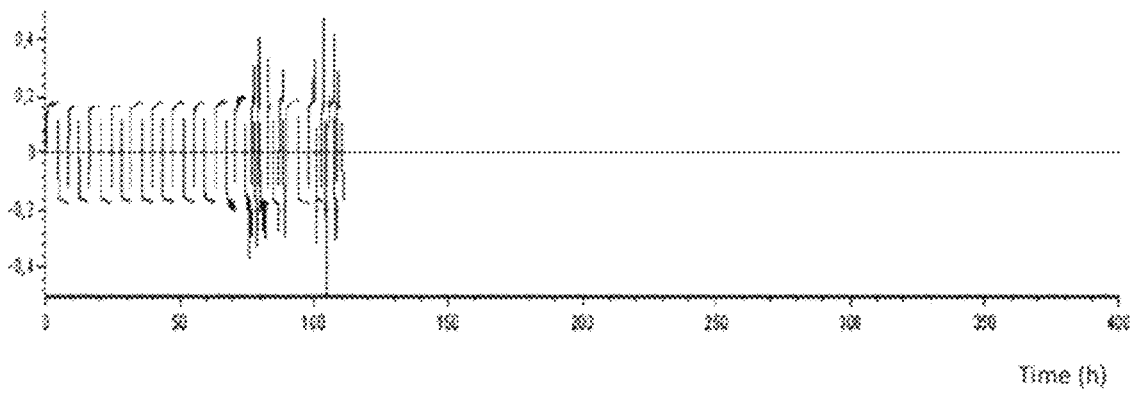
[Fig. 7]
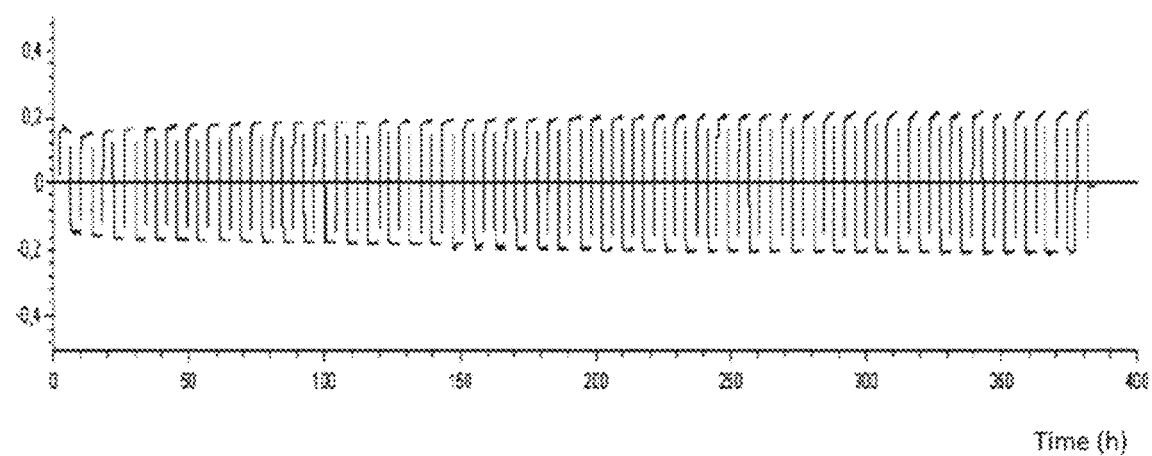

[Fig. 8]
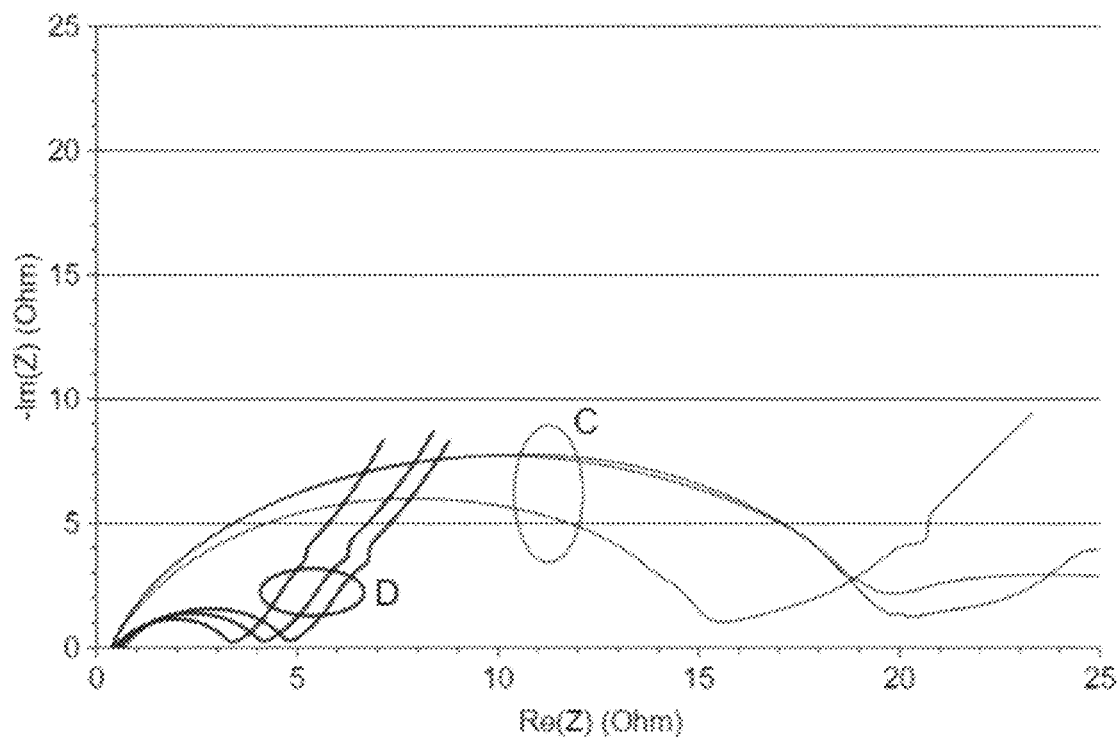
[Fig. 9]
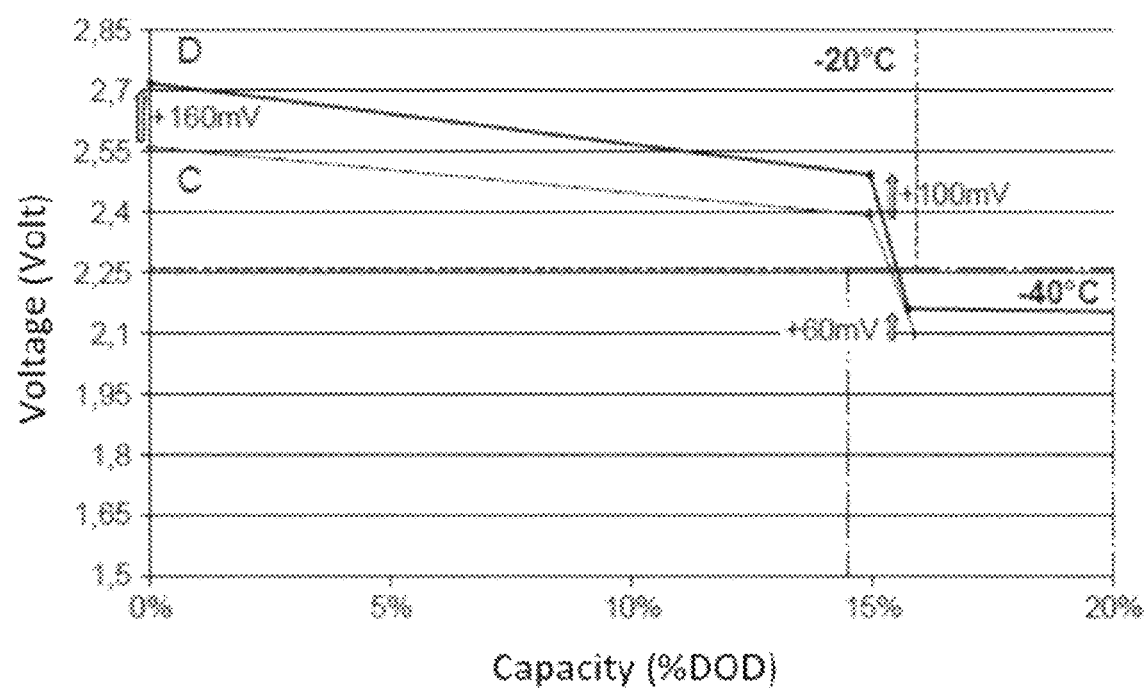

METHOD FOR LASER TREATMENT OF A LITHIUM SURFACE

CROSS REFERENCE TO RELATED APPLICATIONS

This application is a National Stage of International Application No. PCT/EP2021/061314 filed on Apr. 29, 2021, claiming priority based on French Patent Application No. 2004625 filed on May 11, 2020.

FIELD OF THE INVENTION

The technical field of the present invention is that of Li-based active materials which can be used in the negative electrode (anode) of primary or secondary electrochemical cells comprising an organic liquid electrolyte or a solid electrolyte. The technical field is also that of methods for surface treatment of lithium or lithium-based alloy strips or films.

BACKGROUND OF THE INVENTION

Primary electrochemical cells, sometimes called batteries, comprising a negative electrode based on lithium metal are well known and are used in many products, in particular in the automobile, telephony or aeronautics field. These cells, however, cannot be recharged several times due to irreversible structural transformations of the positive electrode material or the significant risk of the appearance of lithium dendrites on the surface of the negative electrode. A lithium dendrite is a protrusion which is formed due to an accumulation of Li on the surface of an electrode. These lithium dendrites are capable of piercing the separator of the cell and bringing about short circuits, which themselves may be at the origin of thermal runaway of the cell if the latter is insufficiently cooled. Dendrites may also be responsible for a decrease in the capacity of the cell, as well as a degradation of its lifetime and its stability over time.

The formation of lithium dendrites during cycling of secondary electrochemical cells is a known problem and described in the prior art. Some solutions have been proposed to deal with this problem.

EP-A-3 442 055 and U.S. Pat. No. 6,835,492 mention this problem and propose a method for manufacturing a negative electrode making it possible to produce a protective film on its surface. The negative electrode is immersed in an acidic solution, for example hydrofluoric acid, to form a protective film of LiF on its surface. It is said that this film prevents the subsequent formation of dendrites.

Documents KR 20170014216 and KR 2018 0023547 also seek to respond to this problem of dendrite formation in lithium metal cells by applying laser treatment methods. The methods described in these two documents consist in creating, with the aid of a laser beam, V-shaped grooves which are evenly spaced apart on the surface of the lithium. The portion of the surface of the strip located between two adjacent grooves is not irradiated with the laser beam. The methods described in these two documents result in the formation of well-defined geometric structures, also referred to as "patterns". However, the Applicant has discovered that the creation of these patterns would result in preferential sites for the creation of dendrites. For example, the line of intersection between one of the two branches of the V and the strip surface forms an edge which constitutes a highly reactive site and a starting point for the growth of lithium dendrites.

There is therefore a need to provide a method for limiting, or even eliminating the phenomenon of creating dendrites in a secondary electrochemical cell (storage cell) the negative electrode of which comprises a lithium strip. It is sought to improve the stability and performance of this strip, in particular its service life.

SUMMARY OF THE INVENTION

The invention provides a method for treating a surface of a strip or a film, said strip or film being made of lithium or a Li-based alloy, the method comprising a step of laser beam irradiation of at least a portion of a surface of said strip or film, the irradiation step being carried out under controlled atmosphere, the entire surface area of said at least one portion of the surface of said strip or film being irradiated by the laser beam.

It has been surprisingly found that the fact of irradiating with a laser beam the entire surface area of at least a portion of one or both surfaces of the strip or film makes it possible to reduce, or even eliminate the formation of dendrites on the surface of the strip. The method according to the invention does not create geometric shapes on the surface of the strip. It does not create edges capable of forming preferential sites for the formation of dendrites.

According to one embodiment, said at least portion of a surface irradiated by the laser beam does not comprise a geometric pattern, regardless of the angle of observation.

According to one embodiment, the method comprises a succession of trajectories of the laser beam above said at least portion of a surface of the strip or of the film, the spacing between two trajectories being less than the size of the focal spot of the laser.

According to one embodiment, one or more of the trajectories of the laser beam are non-linear.

According to one embodiment, the laser is a pulsed laser.

According to one embodiment, the laser emits a wavelength in the infrared (IR) domain.

According to one embodiment, the irradiation step is carried out in anhydrous environment, according to one of the following conditions:
  in an atmosphere of one or more gases selected from oxygen $O_2$, nitrogen $N_2$, argon Ar, helium He and mixtures thereof,
  under vacuum, or
  in a reactive atmosphere or environment with respect to lithium.

According to one embodiment, the reactive atmosphere or environment comprises a compound containing atoms selected from halogens such as fluorine, bromine, chlorine or iodine; sulfur, phosphorus, carbon and a mixture thereof.

According to one embodiment, said strip or film is covered before treatment by a protective or passivation layer.

The invention also provides a lithium or a lithium-based alloy strip or a lithium or a lithium-based alloy film, which can be obtained by the method as defined above.

The strip or film treated by the method according to the invention can be used in the negative electrode of a primary or secondary electrochemical cell. The invention thus provides as a third subject matter an electrode comprising said strip or film as defined above.

The invention also provides as a fourth subject matter a primary or secondary electrochemical cell comprising:
  at least one negative electrode which is the electrode as defined above,
  at least one positive electrode, and
  a liquid or solid electrolyte.

According to one embodiment, said electrochemical cell is a primary electrochemical cell comprising a liquid or solid electrolyte.

According to another embodiment, said electrochemical cell is a secondary electrochemical cell comprising a solid electrolyte.

BRIEF DESCRIPTION OF THE DRAWINGS

FIG. 1 represents scanning electron microscope (SEM) views of the surface of a lithium strip, before (left-hand column) and after (right-hand column) implementation of the method according to the invention. The views were obtained at three different magnifications. The white mark present at the bottom of each view represents, for the two views at the top, a distance of 100 µm, for the two views in the middle a distance of 10 µm and for the two views at the bottom a distance of 1 µm.

FIG. 2 represents at the top lefthand side a scanning electron microscope view of the surface of a lithium strip prior to implementation of the method and at the top righthand side a scanning electron microscope view of the surface of the lithium strip after implementation of the method. In the lefthand side view, two EDS spectra 2a, 2b are represented at two particular points on the surface of the strip before treatment. These two points are identified by the start of two arrows. In the righthand side view, an EDS spectrum 2c is represented; performed over the entire surface of the strip after treatment.

FIG. 3 represents the X-ray diffraction patterns of a rolled lithium metal strip prior to carrying out the method according to the invention (lower curve A) and after implementing the method according to the invention (upper curve B).

FIG. 4 represents the evolution of the interfacial resistance of two symmetrical cells of the Li/polymer electrolyte/Li type. In cell A, the lithium strips used have simply been rolled (curve with diamond-shaped marks). In cell B, the lithium strips used were rolled and then treated by the method according to the invention (curve with circle-shaped marks).

FIG. 5 represents the electrochemical impedance spectra of two symmetrical cells A and B of the Li/polymer electrolyte/Li type. In cell A, the lithium strips have been simply rolled. In cell B, the lithium strips have been rolled and then treated by the method according to the invention. The spectra were plotted at different times of the cycling of these two cells. The arrows indicate the evolution of the spectra as a function of the increase in the number of cycles.

FIG. 6 represents variation in voltage during cycling of a Li/polymer electrolyte/Li type cell in the case where the lithium strip has been simply rolled, when a current of 300 µA/cm$^2$ is applied for 4 h.

FIG. 7 represents variation in voltage during cycling of a Li/polymer electrolyte/Li type cell in the case where the lithium strip has been rolled and then subjected to the method according to the invention, when a current of 300 µA/cm$^2$ is applied for 4 h.

FIG. 8 represents the impedance spectra of 6 Li/MnO$_2$ (primary lithium) cells obtained at −20° C., of which 3 have a lithium metal anode the surface of which was laser treated (curve D), while the others have a non-laser-treated lithium metal anode (curve C). The spectra were plotted after impregnation of the electrodes.

FIG. 9 represents the average over 3 cells of the lowest values observed during current flows. The current pulses were carried out at −20° C. and at −40° C.

DETAILED DESCRIPTION OF EMBODIMENTS OF THE INVENTION

1) The Method According to the Invention

The strip or film on which the method according to the invention is implemented consists of lithium metal or consists of a lithium-based alloy, i.e. comprising at least 50 mol % of lithium, of formula LiM, where M is selected from the group consisting of Mg, Al, Si, B, Ge, Ga, Ag, In, Sn, Zn or a mixture thereof. The strip is in the form of a lithium strip or a strip of a lithium alloy, the thickness of which can range from 100 µm to 2 mm. The film generally has a thickness of 100 µm or less. The film may have a thickness ranging from 1 µm to 50 µm. It should be understood that, throughout the description, the features described in connection with the strip also define the film. Only the thickness differs, which is lower for the film than for the strip. The strip or film may be covered prior to the implementation of the laser treatment with a passivation layer formed naturally and spontaneously by reaction of lithium with the atmosphere in which the strip or film is placed. This passivation layer may comprise lithine LiOH, Li$_3$N, Li$_2$CO$_3$. The strip or film may also be covered with a protective layer deliberately formed by an operator prior to the implementation of the laser treatment.

The method according to the invention makes it possible to increase the specific surface area of the metal strip without creating edges on the surface of the strip conducive to the formation of dendrites. As explained above, the implementation of the laser methods described in documents KR 2017 0014216 and KR 2018 0023547 leads to the formation of geometric patterns. The edges resulting from the formation of these geometric patterns are areas of heterogeneity which are preferred sites for the formation of dendrites.

The method according to the invention makes it possible to obtain a modified surface that does not include any geometric pattern regardless of the angle of observation of this surface. The term "geometrical pattern" or "pattern" is intended to mean an organized and identically repeating structure and the observation of which reveals a distinct geometric shape such as a circle, a polygon, a square, a triangle, a rectangle, a trapezium or any other geometric shape.

The absence of geometric pattern can, for example, be obtained by randomly positioning the laser beam above the strip. The path of the laser beam results from the movement of the laser beam at randomly determined positions. The position of the laser beam is marked by a pair of randomly generated X-Y axis values, for example by a computer program. As an alternative, it is also possible to predetermine a series of pairs of X-Y axis values so that the movement of the laser beam above the surface of the strip does not form a geometric pattern.

The absence of geometric pattern can also be achieved by adjusting the spacing between two paths such that it is less than the size of the focal spot of the laser. Thus, there is obtained an overlap of the imprints formed by the focal spot on the surface of the strip and a total and homogeneous covering of the treated surface, without creating a geometric pattern at the end of treatment. The overlap makes it possible to erase the traces progressively left by the laser beam. Thus, at the end of the treatment, the treated surface does not have visible traces.

The treatment process may be applied to a single surface or on the two opposite surfaces of the strip. Preferably, it is applied to the two opposite surfaces. It is not necessary for the entire surface of the strip selected for treatment to be treated. Only a portion of this surface can be treated, for example at least 50%, or at least 75%, or at least 90%. Nevertheless, it is essential that the entire surface area of said at least one portion of this surface is irradiated with the laser beam.

The laser beam can perform a succession of linear trajectories. Each linear path in a given direction is qualified as a secondary path. The set of secondary trajectories forms the main path. The laser beam may perform a succession of non-linear trajectories. Preferably, the trajectories of the laser beam are non-linear.

The irradiation step is carried out under controlled atmosphere. This means that the composition of the atmosphere in which the process is carried out is fixed by an operator. The controlled atmosphere may also designate a vacuum. According to one embodiment, the irradiation step is carried out in anhydrous medium, according to one of the following controlled atmospheres:

- in an atmosphere of one or more gases selected from oxygen $O_2$, nitrogen $N_2$, argon Ar, helium He, CO, $CO_2$ and mixtures thereof,
- under vacuum, or
- in an atmosphere or environment that is reactive with respect to lithium.

The term atmosphere or environment that is reactive with lithium should be taken to mean an atmosphere or environment comprising chemical elements capable of reacting with lithium. The reactive atmosphere or environment may include a compound containing atoms selected from fluorine, sulfur, phosphorus, carbon and a mixture thereof. The reactive atmosphere or environment may comprise a compound containing atoms selected from halogens. Said halogens are chosen from fluorine, bromine, chlorine and iodine.

The reactive environment may be solid, liquid, gaseous, plasma or a mixture thereof.

The laser used in the method of the invention may be a laser operating in a pulsed mode or in a continuous mode. Preferably, the laser operates in a pulsed mode. More advantageously, the laser is a nano-pulsed laser. The pulse duration of the laser may be less than or equal to 500 nanoseconds (ns), preferably less than or equal to 300 ns. Advantageously, the pulse duration is 250 ns+/−10 ns. A special feature of the laser method is that the very short duration of the laser pulses makes it possible to release a very high power. The energy supplied by the laser beam enables the creation or disappearance of species on the face of the lithium by virtue of the interaction between the lithium and the controlled atmosphere.

According to one embodiment, the laser emits a wavelength in the infrared (IR), i.e. a wavelength between 700 nm and 0.1 mm. Preferably, the wavelength is between 900 nm and 2000 nm. Lasers suitable for implementing the method are the TruMark 1110 and TruMark 5010 models sold by the Trumpf company. The main features of these lasers are reproduced in Table 1 below and also available in the technical brochure of Mar. 26, 2020 on-line on the TRUMPF company's website.

TABLE 1

| | TruMark 1110 | TruMark 5010 |
|---|---|---|
| Wavelength | 1064 nm | 1062 nm ± 3 nm |
| Pulse repetition frequency | Cw, 15 kHz-100 kHz | 1 kHz-200 kHz |
| Min. focal diameter. | 50 μm for a focal length of 160 mm | 45 μm |

TABLE 1-continued

| | TruMark 1110 | TruMark 5010 |
|---|---|---|
| MAX. INTERNAL FOCAL POSITION CONTROL. | ±7 mm for a focal length of 160 mm | ±24 mm for a focal length of 254 mm |
| Max. size of inscribing field | 110 mm × 110 mm for a focal length of 160 mm | 170 mm × 170 mm for a focal length of 254 mm |

A computer controls the movement of the laser beam. As explained above, the position of the laser beam is indicated by a pair of X-Y values generated at random by the computer. As an alternative, it is also possible to predetermine a series of pairs of X-Y axis values and enter this series of pairs of values into the computer. The computer controls the position of the laser beam from this series of pairs of values.

2) The Strip or Film Obtained by the Method According to the Invention.

A second subject matter of the invention is a lithium strip or film or a strip or a film based on a lithium alloy, which can be obtained by the method as defined above. The Applicant has discovered that the process of treatment according to the invention had the effect of modifying the structure of the strip on the nano-scale and the surface chemistry of the lithium strip or film, thereby creating beneficial effects on the key aspects of the operation of an electrochemical cell. The method according to the invention gives the strip or the film the following properties:

a) an increase in the specific surface area of the strip leading to better kinetics and a decrease in current densities and thus a reduction in the risk of creating dendrites. The specific surface area of the strip is increased, the current density is lower, reducing the risk of dendrite creation. The surface of the strip is modified without forming edges.

b) a surface of the lithium strip cleaned of contaminants capable of negatively impacting the operation of the cell, and in particular the passivation layer naturally formed.

c) relaxation of stress in the lithium strip leading to a reduction in the risks of dendrite formation.

d) a modification of surface chemistry in order to create a protective passivation layer, this layer allowing a decrease in interfacial resistance and an improvement in lifetime under cycling of a cell, at least one of the electrodes of which incorporates the strip treated by the method according to the invention.

In addition, the method according to the invention does not cause any significant removal of material, meaning that mastery of the composition of the passivation layer makes it even possible to lead to an increase in thickness of the lithium strip or film.

Regarding property a): FIG. 1 shows views obtained by scanning electron microscope of the surface of a lithium strip, before (left-hand column) and after (right-hand column) implementation of the method according to the invention. The views were obtained at three different magnifications. A comparison of the right-hand column views obtained after the process with those of the left-hand column obtained prior to the implementation of the method shows that the treated surfaces have a texturing which is not observed on the untreated surfaces and this at the three magnifications. The method creates asperities on the surface of the strip without, however creating geometric shapes, or forming edges conducive to the formation of dendrites. The formation of asperities makes it possible to increase the specific surface area of the strip.

Regarding property b): FIG. 2 shows, at the top left, a scanning electron microscope view of the surface of a lithium strip prior to carrying out the process and at the top righthand side a scanning electron microscope view of the surface of the lithium strip after implementation of the method. In the lefthand side view, two EDS spectra 2a, 2b of two particular points on the surface of the strip are shown. These two points are marked by the start of two arrows. Spectrum 2a shows a first group of three peaks, the third peak being the one having the highest intensity, and a group of two peaks. In the righthand view, an EDS spectrum 2c of the totality of the surface of the strip after treatment is shown. It can be noted that the second group of two peaks present on the spectrum 2a no longer appears on the spectrum 2c, indicating the disappearance of certain impurities from the surface of the strip after treatment. The implementation of the method makes it possible to clean the surface of contaminating chemical elements capable of adversely affecting the operation of the cell, such as Na, Al, K and Si.

Regarding property c): The method according to the invention makes it possible to obtain a metal strip with fewer mechanical stresses. This effect is demonstrated using the X-ray diffraction spectra of two lithium strips, one having only been rolled, the other having been rolled and then subjected to the method according to the invention. The spectrum of an only-rolled lithium strip generally has a high intensity peak which indicates the orientation of the planes in a main orientation (preferential orientation). The spectrum obtained on the strip having been subjected to the method according to the invention has a peak corresponding to the orientation of the planes in the preferential direction, but this is of lesser intensity. In addition, the occurrence of new peaks that indicate new orientations taken by the crystal planes is noted. This shows that after application of the laser treatment according to the invention, some crystal planes are no longer oriented according to the preferential orientation. The method according to the invention therefore makes it possible to relax mechanical stresses in the strip. This relaxation of the stresses in the lithium strip which has undergone the irradiation step leads in particular to a reduction in the risks of dendrite formation.

By way of example, FIG. 3 compares the X-ray diffraction pattern of a rolled but not laser beam treated lithium strip with that of a lithium strip rolled and then laser beam treated according to the method of the invention. The X-ray diffraction pattern of the rolled strip (spectrum A) has a main peak at an angle 2θ of about 36°. This angle corresponds to the X-ray diffraction by the crystal plane of index (110). By comparison, the X-ray diffraction pattern of the rolled and then treated film (spectrum B) has a main peak at an angle 2θ of about 36° but at a lower intensity, a second peak at an angle 2θ of about 52° and a third peak at an angle 2θ of about 65°. The second peak corresponds to the crystal plane of index (200). The third peak corresponds to the crystal plane of index (211).

Thus, according to one embodiment, the strip or the film obtained by the method of the invention has an X-ray diffraction pattern (DRX) comprising a major peak at an angle 2θ of 36° and a second peak at an angle 2θ of 52° and/or a third peak at an angle 2θ of 65°.

Regarding property d): The method according to the invention forms a protective passivation layer on the surface of the strip or film. This passivation layer comprises the elements carbon and oxygen. The presence of these elements can be demonstrated using the energy dispersive X-ray spectroscopy (EDX) technique. Tests on the experimental portion show that this protective passivation layer allows a decrease in resistance at the interface between the strip and the electrolyte of the cell. It enables improvement in cycling lifetime of an electrochemical cell, of which at least one of the electrodes incorporates the strip treated by the method according to the invention.

The decrease in interfacial resistance makes it possible to use the strip in primary, or in secondary electrochemical cells known as power cells, i.e. intended to be charged/discharged under high currents, for example at least C/2, C being the nominal capacity of the cell. The composition of the passivation layer can be modified according to the composition of the controlled atmosphere in which the passivation layer has been created ($N_2$, Ar, sulfur or fluorine gas, void . . . )

3) An Electrode Comprising the Strip or Film Obtained by the Method According to the Invention.

The invention also provides an electrode comprising said strip or film as defined above. The electrode includes a current collector attached to one of the ends of the strip. The current collector may be solid or have an openwork structure. The current collector may be selected from the group consisting of a perforated metal, a metal, a grid, a metal fabric and is made of a material selected from copper, stainless steel and nickel, preferably copper. The strip may be attached to the current collector by a rolling method. The assembly formed by the strip and the current collector forms an electrode.

4) An Electrochemical Cell Comprising the Electrode

A fourth subject matter of the invention is an electrochemical cell comprising:

at least one negative electrode, at least one positive electrode, and a liquid or solid electrolyte.

At least one of the positive electrode and negative electrode comprises the strip or film as described above. Preferably, the strip or film is used in the manufacture of the negative electrode.

According to one embodiment, the electrochemical cell is a primary electrochemical cell comprising a liquid or solid electrolyte. The use of the strip obtained by the method according to the invention makes it possible to reduce the voltage drop which occurs when the primary cell is discharged under high current pulses at a very low temperature, for example −40° C.

According to another embodiment, the electrochemical cell is a secondary cell comprising a solid electrolyte, for example an ionic conducting polymer. The invention therefore finds an application in the development of "all-solid" electrochemical cells.

EXAMPLES

The applicant prepared different lithium strips and subjected to the method of the invention in order to evaluate the effects of the method. In the following examples, the step of radiation by laser beam was carried out using the TruMark 5010 laser marketed by the Trumpf company, at a wavelength of 1069+/−10 nm and the pulse duration of which is 250 ns+/−10 ns.

Settings:
 Laser mode—wobbling
 Pulse frequency of 20 kHz.
 Speed of movement of the beam=500 mm per second, at 15% of laser power.
 No defocusing.
 The spacing between each trajectory is 20 µm or less.
 In several successive passes (one pass makes it possible to cover the entire surface), the main direction of the beam being oriented differently from one pass to the other.

Two symmetrical cells A and B were manufactured. These cells are called symmetrical as they comprise a working electrode and a counter-electrode each consisting of a lithium strip. The two electrodes are separated by an ionic conductive polymer serving as a solid electrolyte. In cell A, the lithium strips used have simply been rolled. In cell B, the lithium strips used have been rolled and then treated by the method according to the invention. The resistance at the interface between the strip of Li and the ionic conductive polymer was measured in cycling at a temperature of 25° C. The evolution of this interfacial resistance over time was plotted. It is shown in FIG. 4. It was found that the interfacial resistance values are approximately six times less for cell B than for cell A, which demonstrates the interest of the treatment according to the invention.

The cells underwent cycling. The impedance spectra were plotted for the cells A and B at different times of cycling. The cells A and B were in a charged state at the time of obtaining the impedance spectrum. The impedance spectra are shown in FIG. 5 The interfacial resistance at a given time of cycling is proportional to the diameter of the loop of the impedance spectrum. It was found that the interfacial resistance of cell B is lower than that of cell A. It was also found that for both cells A and B, interfacial resistance increases with the number of cycles. However, the increase in interfacial resistance during cycling is lower in the case of cell B than in the case of cell A. These results show that the method according to the invention makes it possible to delay the ageing of the lithium strip.

The voltage of the cells A and B was measured during cycling consisting of a series of lithium plating and stripping phases. This cycling was carried out at 60° C., the current density was 300 µA/cm$^2$ of strip. The amount of electricity passing through the cell during each phase was 1.2 mAh. This amount of current corresponds to an amount of lithium metal of about 6 µm i.e. removed from the strip during the stripping step or deposited on the surface of the strip during the plating step. FIG. 6 shows the variation in the voltage of the working electrode of cell A during cycling. It was found that from 70 hours of cycling, an irregular variation of the voltage, due to the formation of dendrites occurred. FIG. 7 shows the variation in the voltage of the working electrode of cell B during cycling. It is found that the voltage varies regularly over time. The treatment method slows down, or even eliminates formation of dendrites and prolongs the service life of the cell in cycling. Without wishing to be bound by any theory, the applicant believes that the method creates a protective passivation layer that is beneficial to the operation of the cell. This beneficial effect is demonstrated through the decrease in interfacial resistance (FIG. 5) and cycling lifetime (FIGS. 6 and 7).

FIG. 8 shows the impedance spectra of 6 Li/MnO$_2$ (primary lithium) cells obtained at −20° C., of which 3 had a lithium metal anode the surface of which had been laser treated (curve D), while the other 3 had a non-laser-treated lithium metal anode (curve C). It is here obvious, that with the iso-design of these 6 cells (the same cathode, the same electrolyte composition), the complex impedances of the treated cells are significantly lower than that of the cells without treatment. The dimensions of the electrodes being the same for these 6 cells, it consequently appears that the thickness of the SEI (Solid-Electrolyte Interface) created on the surface of the lithium metal is less resistive in the cells the anode of which has been laser treated.

FIG. 9 shows the average over 3 cells of the lowest values observed during current pulses. These pulses were performed on the same cells as those of FIG. 8. These pulses carried out at −20° C. at the rate of C/6 for 1 second, demonstrate the correlation of the values obtained with those of the impedance measurements; the cells having the lowest impedance have higher values during low-temperature pulsing conditions.

The invention claimed is:

1. A method for treating a surface of a strip or film, said strip or film being made of lithium or a lithium-based alloy, the method comprising a step of laser beam irradiation of at least a portion of a surface of said strip or film, the irradiation step being carried out under controlled atmosphere, the entire surface area of said at least one surface portion of the strip or film being irradiated by the laser beam,
 the method comprising a succession of trajectories of the laser beam above said at least one portion of a surface of the strip or film, the spacing between two trajectories being less than the size of the focal spot of the laser, so that the portion of the surface irradiated by the laser beam does not include a geometric pattern, regardless of the angle of observation, and is modified without forming edges.

2. The method of claim 1, wherein one or more of the trajectories of the laser beam are non-linear.

3. The method according to claim 1, wherein the laser is a pulsed laser.

4. The method according to claim 1, wherein the laser emits a wavelength in the infrared (IR) domain.

5. The method according to claim 1, wherein the irradiation step is carried out in anhydrous medium, according to one of the following conditions:
 in an atmosphere of one or more gases selected from oxygen O$_2$, nitrogen N$_2$, argon Ar, helium He and mixtures thereof,
 under vacuum, or
 in a reactive atmosphere or environment with respect to lithium.

6. The method according to claim 5, wherein the reactive atmosphere or environment comprises a compound containing atoms selected from fluorine, sulfur, phosphorus, carbon and a mixture thereof.

7. The method according to claim 1, wherein said strip or film is covered before treatment by a protective or passivation layer.

8. A strip or film made of lithium or a lithium-based alloy comprising a surface, a portion of the surface being treated by the method as defined in claim 1, in which the entire surface area of said portion does not include any geometric pattern, regardless of the angle of observation, and does not include edges.

9. An electrode comprising the strip or film as defined in claim 8.

10. An electrochemical cell comprising:
at least one negative electrode which is the electrode as defined in claim 9,
at least one positive electrode, and
a liquid or solid electrolyte.

11. The electrochemical cell of claim 10, which is a primary electrochemical cell comprising a liquid or solid electrolyte.

12. The electrochemical cell of claim 10, which is a secondary electrochemical cell comprising a solid electrolyte.

\* \* \* \* \*